Jan. 12, 1926. 1,569,261
J. M. CALKINS
DIRIGIBLE HEADLIGHT FOR VEHICLES
Filed Dec. 8, 1924
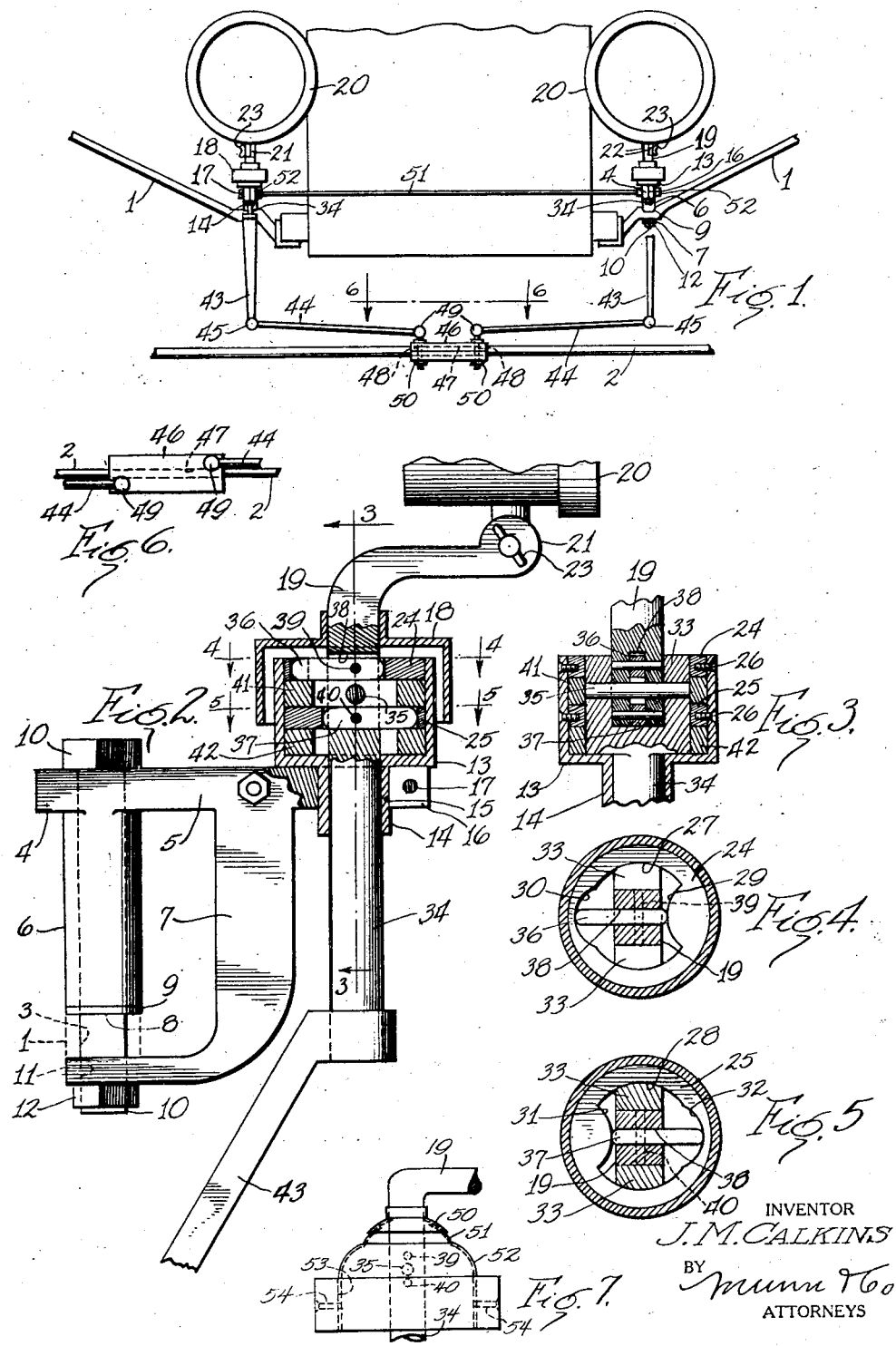
INVENTOR
J. M. CALKINS
BY Munn & Co
ATTORNEYS Patented Jan. 12, 1926.

1,569,261

UNITED STATES PATENT OFFICE.

JAMES M. CALKINS, OF PEORIA, ILLINOIS, ASSIGNOR TO SCOTT HEAD LAMP CONTROL, OF MIAMI, FLORIDA, A CORPORATION OF FLORIDA.

DIRIGIBLE HEADLIGHT FOR VEHICLES.

Application filed December 8, 1924. Serial No. 754,608.

*To all whom it may concern:*

Be it known that I, JAMES M. CALKINS, a citizen of the United States, and a resident of Peoria, county of Peoria, State of Illinois, have invented a new and useful Improvement in Dirigible Headlights for Vehicles, of which the following is a full, clear, and exact description.

My invention relates to improvements in dirigible headlights for vehicles, and it consists in the combinations, constructions, and arrangements herein described and claimed.

An object of my invention is to provide a dirigible headlight for vehicles in which the working mechanism is entirely housed so as to be protected from foreign matter, and in which the mechanism is constructed so as to tilt the headlight forwardly as the headlight is turned with the wheels, this movement being balanced so as to give long life to the working parts.

A further object of my invention is to provide a dirigible headlight for vehicles which makes use of two novel cam discs which coact with two headlight moving pins, these pins being disposed in such relation to the headlight as to reduce the force necessary to swing the headlight, to a minimum, whereby the headlight may be readily moved.

A further object of my invention is to provide a dirigible headlight for vehicles which makes use of novel means for connecting the headlights to the steering mechanism.

Other objects and advantages will appear in the following specification, and the novel features of the invention will be particularly pointed out in the appended claims.

My invention is illustrated in the accompanying drawings forming part of this application, in which Figure 1 is a front elevation of an automobile showing the headlight operatively applied thereto, Figure 2 is a side elevation of one of the headlight moving devices with portions of the casing and moving parts removed so as to clearly show the operation of the device, Figure 3 is a section along the line 3—3 of Figure 2, Figure 4 is a section along the line 4—4 of Figure 2, Figure 5 is a section along the line 5—5 of Figure 2, Figure 6 is a section along the line 6—6 of Figure 1, and Figure 7 is a diagrammatic view of a modified form of the device.

In carrying out my invention I provide an automobile which in the present instance is of the Ford type, and make use of the fender and lamp supporting arms 1 and also the spindle connecting rod 2. The arms 1 have openings 3 therein which normally receive the standard Ford headlights. When applying my device, the Ford headlights are removed and the bracket 4 shown in Figure 2 is secured to the arm 1 in place of the standard Ford bracket.

The special construction of the bracket 4 is clearly shown in Figure 2 and comprises a supporting plate 5 which has a tubular portion 6 depending therefrom and a J-shaped member 7 also depending therefrom, which is adapted to bear against the under side of the arm 1. It should be noted that two brackets are provided for each car. The lower end 8 of the tubular member 6 is wedge-shaped as shown at 9 in Figure 1, so as to permit the tubular member 6 to be seated in the recess already provided in the Ford arm. The brackets 4 are locked to the arm 1 by means of bolts 10 which are inserted through the tubular members 6 and extend through the openings 3. The bolts 10 also extend through openings 11 in the bracing member 7. A nut 12 is screwed upon the lower end of each of the bolts and locks the brackets 4 to the arms 1. This construction rigidly secures the brackets to the arms.

The special means for moving the headlights so as to cause the headlights to turn with the wheels, and at the same time swing forwardly, is shown in Figures 2 to 5 inclusive. The mechanism is housed in a casing 13, which has a tubular shank 14 that is inserted in an opening 15 in the plate 5. As clearly shown in Figures 1 and 2, the plate 5 is split at 16 and the two parts of the plate are adapted to be drawn together by means of a screw 17 so as to cause the parts to bind upon the tubular shank 14 and thus lock the shank in place. In this way the casing 13 is prevented from rotation with respect to the plate 5 and is also held against vertical movement. The top of the casing 13 is open and is enclosed by a cover 18 which in turn is secured to a headlight supporting arm 19.

The headlight 20 is connected to the arm 19 by means of a joint 21. The joint consists of two halves 22 which have their adjacent surfaces serrated, whereby the halves may be clamped together by means of a wing screw 23 so as to hold the headlight in adjusted position.

The means for moving the arm 19 comprises two discs 24 and 25 which are shown in Figures 4 and 5. The discs are secured to the casing 13 by means of screws 26 and have cam-shaped bores 27 and 28. The discs 24 and 25 are identical in construction, but are disposed in the casing 13 in such a manner that the cam surfaces are arranged in reverse position with respect to each other. Figure 4 shows the disc 24 as being provided with a convex cam surface 29 and with a concave cam surface 30 while Figure 5 shows the disc 25 as being provided with a convex cam surface 31 and a concave cam surface 32. The bores 27 and 28 are large enough to permit the lower end of the arm 19 to be received in the bores. Figure 3 shows how the arm 19 extends into the bores 27 and 28 and also as being received between the bifurcated sides 33 of the bifurcated end of a lamp actuating rod 34. The bifurcated end 33 carries a pin 35 which extends through the arm 19 and pivotally connects the arm to the rod 34. It will be seen from the construction described thus far that the arm 19 may swing about the pin 35 as a pivot and also be swung when the rod 34 is rotated.

The means for swinging the arm 19 forwardly consists of the cam-shaped portions 29 to 32 inclusive of the discs 24 and 25 and also the fingers 36 and 37. It will be noted from Figure 3 that the fingers extend through a slot 38 in the arm 19 and are pivotally connected to the arm 19 by means of pins 39 and 40. When the light is in normal position the pins 35, 39, and 40 are in vertical alignment, and the fingers 36 and 37 are in the position shown in Figures 4 and 5. If now the rod 34 is rotated by means of a mechanism hereinafter described, the rod will cause the arm 19 and the fingers 36 and 37 to be swung with respect to the discs 24 and 25. The cam surfaces 29 to 32 inclusive will cause the fingers to move longitudinally. Since the fingers are pivoted to the arm 19, they will cause the arm to swing about the pin 35 as a pivot when the fingers are moved longitudinally. I have found that two fingers 36 and 37 will more readily swing the arm 19 than would one finger, although one finger will cause the arm 19 to swing forwardly. Another advantage in providing two fingers instead of one lies in the fact that the same force is exerted upon the arm above the pin 35 as is exerted upon the arm below the pin 35. In other words, the movements of the fingers 36 and 37 in opposite directions balance each other and therefore do not subject the parts to undue wear and thus prolong the life of the device. Washers 41 and 42 are disposed between the discs 24 and 25 and act as guides for the fingers 36 and 37.

The mechanism for rotating the rods 34 comprises an arm 43 which is connected to each rod 34 at the lower end thereof. I have found that when the arm 43 is connected to the rod 34 at a position which is disposed in the same horizontal plane as the opening 3 in the arm 1 that the arm 43 may be swung without tending to force the rod 34 upwardly. I have therefore connected the arm 43 to the arm 34 in the manner shown in Figure 2. The lower end of each arm 43 is connected to the link 44 by means of a ball and socket joint 45. In Figure 6 I have shown a block 46 as being provided with a bore 47 which receives the spindle connecting rod 2. The block 46 is clamped to the rod 2 by means of bolts 48, these bolts being disposed diagonally with respect to each other, and are provided with spherical heads which receive sockets 49 that are carried by the links 44. Nuts 50 lock the bolts to the block 46. When the steering wheel (not shown) is turned it will move the rod 2 and will in turn actuate the links 44 and the arms 43 so as to rotate the rods 34. The rods 34 in turn will swing the headlights 20 in the manner heretofore described.

From the foregoing description of the various parts of the device, the operation thereof may be readily understood. It will be noted from Figure 1 that the bottom of the tubular member 6 is spaced slightly above the arms 1 so as to cause the tapered portions of the tubular members to bear against the tapered portions in the arms 1. This construction permits the tubular members 6 to be wedged in the recess 9 and thereby provide a firm support for the headlights. The brackets 4 are connected to each other by means of a rod 51 which has threaded ends upon which are disposed nuts 52. The nuts are tightened against the plates 5 and hold the brackets against lateral movement. In turning the headlights, the driver merely has to turn the steering wheel, whereupon the rods 34 are actuated by the mechanism already described. The rods in turn cause the fingers 36 and 37 to be moved by the cam surfaces, and thereby swing the headlight laterally and forwardly when the wheels are turned.

One of the principal advantages of the devices lies in the fact that the entire mechanism is housed in a small casing. This casing acts as a protector to the moving parts, and at the same time is designed so as to provide a device that is ornamental to the car. The moving parts are simple in construction and are so designed that they are not subjected to undue wear, and will therefore have a long life.

In Figure 7 I have shown a modified form of the device which is identical to the preferred form of the device in operation. The cover 50 however in this form of the device is spherical and contacts with a spherical-shaped portion 51 of the casing 52. In this way a dust-proof cover is provided for the device. Furthermore the shape of the device is made more ornamental in appearance.

The bracket 4 has a large opening 53 therein in which the lower end of the casing 52 is disposed. Screws 54 secure the casing to the bracket.

I claim:

1. In a dirigible headlight construction, a casing, discs carried by said casing, said discs having cam surfaces, fingers adapted to be moved longitudinally by said discs when said fingers are swung with respect to said discs, an arm for supporting a headlight, said fingers being operatively connected to said arm, whereby movement of said fingers will swing said arm.

2. In a dirigible headlight construction, a casing, a headlight carried by said casing, a disc carried by said casing and having cam surfaces, a finger adapted to be moved, and when moved adapted to be actuated by said cam surface, said finger being operatively connected to said headlight so as to swing the headlight, and means for actuating said finger.

3. In a dirigible headlight construction, a casing, a disc carried by said casing and having a cam surface, a finger adapted to be moved longitudinally by said disc when said finger is swung with respect to said disc, a headlight, said finger being operatively connected to said headlight, whereby movement of said finger will swing said headlight.

4. In a dirigible headlight construction, a casing, discs carried by said casing and having cam surfaces, fingers disposed in said casing and adapted to be moved longitudinally by said discs when said fingers are swung with respect to said discs, means for swinging said fingers, an arm for supporting a headlight, said fingers being operatively connected to said arm, whereby movement of said fingers will swing said arm, and means for adjusting said headlight with respect to said arm.

5. In a dirigible headlight construction, a frame adapted to be secured to a vehicle, a casing carried by said frame, a headlight, means disposed in said casing for supporting and for moving said headlight, said means comprising a plurality of discs having cam surfaces, fingers adapted to be moved longitudinally by said discs when said fingers are swung with respect to said discs, means for swinging said fingers, said means being actuated by the steering mechanism of the vehicle, said fingers being operatively connected to said headlight, whereby movement of said fingers will swing said headlight.

JAMES M. CALKINS.